(12) United States Patent
Boswell et al.

(10) Patent No.: US 6,862,506 B2
(45) Date of Patent: Mar. 1, 2005

(54) METHOD FOR AUTOMATICALLY ADJUSTING REFERENCE MODELS IN VEHICLE STABILITY ENHANCEMENT (VSE) SYSTEMS

(75) Inventors: Karen A. Boswell, Freeland, MI (US); John D. Martens, Hudson, MI (US); Edward J. Bedner, Brighton, MI (US); Brian P. McDonald, Saginaw, MI (US); Hsien H. Chen, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 134 days.

(21) Appl. No.: 10/080,015

(22) Filed: Feb. 19, 2002

(65) Prior Publication Data

US 2003/0045980 A1 Mar. 6, 2003

Related U.S. Application Data

(60) Provisional application No. 60/315,616, filed on Aug. 29, 2001.

(51) Int. Cl.[7] .............................. G06F 7/00; G06F 17/00
(52) U.S. Cl. .............................. 701/41; 701/70; 701/82; 701/1; 180/197; 180/412; 180/252; 180/280; 180/443
(58) Field of Search .............................. 701/41–42, 70, 701/71, 72, 73, 74, 75, 82; 180/197, 412, 413, 416, 443, 445, 252, 280

(56) References Cited

U.S. PATENT DOCUMENTS

| | | | |
|---|---|---|---|
| 4,842,089 A | 6/1989 | Kimbrough et al. ....... 180/79.1 |
| 5,111,901 A | 5/1992 | Bachhuber et al. | |
| 5,297,646 A | 3/1994 | Yamamura et al. | |
| 5,720,533 A | 2/1998 | Pastor et al. ................ 303/147 |
| 5,746,486 A | 5/1998 | Pastor et al. ................ 303/146 |
| 5,941,919 A | 8/1999 | Pastor et al. ................... 701/36 |
| 5,991,675 A | 11/1999 | Asanuma | |
| 6,035,251 A | 3/2000 | Hac et al. ...................... 701/70 |
| 6,212,461 B1 | 4/2001 | Ghoneim et al. ............. 701/70 |
| 6,282,479 B1 | 8/2001 | Ghoneim et al. ............. 701/70 |
| 6,643,573 B2 * | 11/2003 | Dickinson et al. ............ 701/41 |

FOREIGN PATENT DOCUMENTS

| | | |
|---|---|---|
| EP | 0 278 336 | 8/1988 |
| WO | WO01/47762 | 7/2001 |

OTHER PUBLICATIONS

Hsien H. Chen, "Performance Limits of Front–Augmented Steer and Rear–Wheel Steer Systems," Aug. 10, 1999, pp. 1–16.

Youssef A. Ghoneim, William C. Lin, David M. Sidlosky, Hsien H. Chen, Yuen–Kwok Chin and Michael J. Tedrake, "Integrated Chassis Control System to Enhance Vehicle Stability," *International Journal of Vehicle Design*, vol. 23, Nos. 1/2, 2000, pp. 124–144.

Thomas D. Gillespie, *Fundamentals of Vehicle Dynamics*, 1992, pp. 199–202, & 301–302.

* cited by examiner

Primary Examiner—Thomas G. Black
Assistant Examiner—Olga Hernandez
(74) Attorney, Agent, or Firm—Michael D. Smith

(57) ABSTRACT

A method for automatically adjusting a vehicle stability enhancement (VSE) system is disclosed. The VSE system is used in conjunction with a steering system having a plurality of driver-selectable steering modes associated therewith. In an exemplary embodiment, the method includes configuring a reference model within the VSE system to generate desired vehicle handling aspects, the desired vehicle handling aspects being a function of one or more driver inputs to the steering system. Then, a determination is made as to which of the plurality of driver-selectable steering modes is activated, wherein each of the desired vehicle handling aspects generated is made further dependent upon a specific steering mode selected.

39 Claims, 8 Drawing Sheets

METHOD FOR AUTOMATICALLY ADJUSTING REFERENCE MODELS IN VEHICLE STABILITY ENHANCEMENT (VSE) SYSTEMS

CROSS REFERENCE TO RELATED APPLICATIONS

This application claims the benefit of U.S. provisional application No. 60/315,616 filed Aug. 29, 2001, the contents of which are incorporated by reference herein in their entirety.

BACKGROUND

The present disclosure relates generally to automobile steering systems and, more particularly, to a method for automatically adjusting reference models used vehicle stability enhancement systems in response to a change in steering mode.

"Driver's preference" is a feature available in certain electric front controlled, rear controlled or four-wheel automobile steering systems. A drivers preference switch may include settings such as "sporty", "normal", "trailering", "system off", or other modes representing various vehicle-handling objectives. As a driver changes the preference from one mode to another, a step change in a rear or front steer command could occur. Such a step change, however, may be both noticeable and unacceptable to the driver.

In addition, certain Vehicle Stability Enhancement (VSE) systems currently in existence typically employ a "Reference Model" algorithm that calculates a desirable handling motion for the vehicle. Such reference model algorithms have historically assumed that the desirable handling motion of the vehicle is solely a function of handwheel angle and vehicle speed. However, with the advent of new vehicle systems such as four-wheel steering, rear wheel steering, front controlled steering, active roll control and the like, the desirable handling motion may change when the new system state changes (e.g., as a result of driver preference changes or initial system activation). Thus, the existing reference models are typically not sufficient for use in a VSE system with multiple modes of steering, wherein each steering mode may have different desirable handling responses associated therewith.

SUMMARY

The above discussed and other drawbacks and deficiencies of the prior art are overcome or alleviated by a method for automatically adjusting a vehicle stability enhancement (VSE) system, the VSE system used in conjunction with a steering system having a plurality of driver-selectable steering modes associated therewith. In an exemplary embodiment, the method includes configuring a reference model within the VSE system to generate desired vehicle handling aspects, the desired vehicle handling aspects being a function of one or more driver inputs to the steering system. Then, a determination is made as to which of the plurality of driver-selectable steering modes is activated, wherein each of the desired vehicle handling aspects generated is made further dependent upon a specific steering mode selected.

In a preferred embodiment, desired vehicle handling aspects further include a desired steady state yaw rate, a desired steady state sideslip, a desired damping ratio, and a desired natural frequency. The one or more driver inputs further include a handwheel angle (HWA) and a vehicle speed. In one embodiment, the method further includes configuring a set of lookup tables for generating each of the desired vehicle handling aspects, wherein each lookup table within the set of lookup tables is individually tuned so as to correspond to the specific steering mode selected.

The set of lookup tables corresponding to the desired steady state yaw rate have the HWA as a first input thereto, and the vehicle speed as a second input thereto. The set of lookup tables corresponding to the desired steady state sideslip have the HWA as a first input thereto, and the vehicle speed as a second input thereto. The set of lookup tables corresponding to the desired damping ratio and the desired natural frequency have the vehicle speed as a first input thereto. A switching mechanism is configured to have a plurality of outputs therefrom corresponding to the desired vehicle handling aspects. The switching mechanism further has said set of lookup tables as inputs thereto, wherein, responsive to the specific steering mode selected, the switching mechanism selectively couples the inputs thereto to the outputs therefrom.

In an alternative embodiment, the desired steady state yaw rate for a given selected steering mode is generated by configuring a base lookup table to accept the HWA as a first input thereto and the vehicle speed as a second input thereto. A rear angle lookup table is configured to accept a commanded, open-loop rear wheel angle (RWA) as a first input thereto and the vehicle speed as a second input thereto. Then, a resulting output from the base lookup table is summed with a resulting output from the rear angle lookup table.

In still an alternative embodiment, the desired steady state yaw rate for a given selected steering mode is generated by calculating a first yaw rate component and determining whether the specific steering mode selected results in a rear wheel angle (RWA) input being generated. If an RWA input is generated, then a second yaw rate component is calculated. However, if no RWA input is generated, then the second yaw rate component is set equal to zero. The first yaw rate component is then summed with the second yaw rate component.

BRIEF DESCRIPTION OF THE DRAWINGS

Referring to the exemplary drawings wherein like elements are numbered alike in the several Figures:

FIG. 7 is a graph that illustrates yaw rate comparisons between simulated results and actual test results for the test vehicle in a four-wheel steer mode with commanded, open-loop control on.

DETAILED DESCRIPTION

Figure 1:
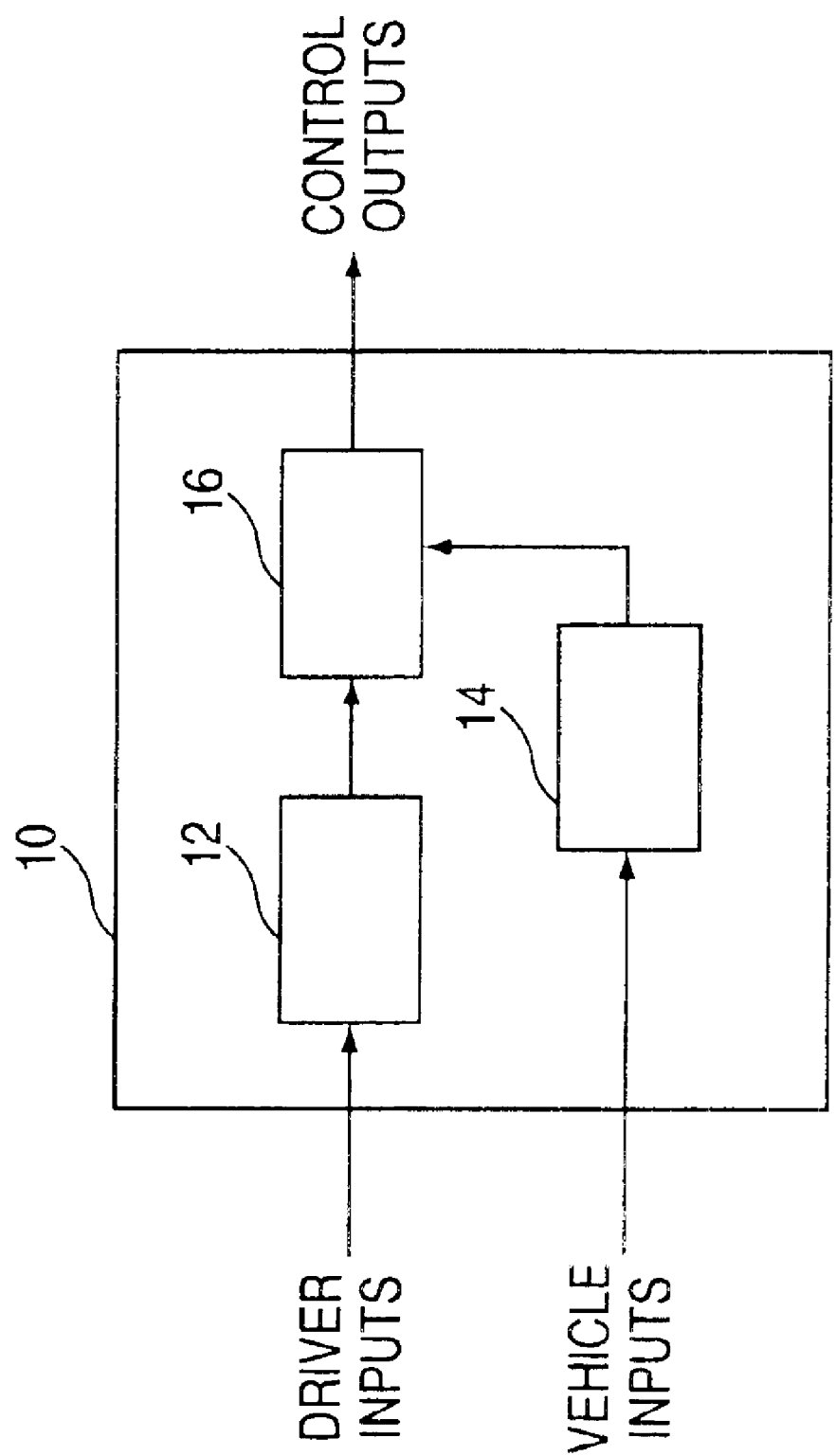
FIG. 1 is a block diagram representative of an exemplary Vehicle Stability Enhancement (VSE) system.

Referring initially to FIG. 1, there is shown a simplified block diagram of an exemplary Vehicle Stability Enhancement (VSE) system 10. The VSE system 10 provides closed-loop, yaw rate control to achieve vehicle stability objectives. In addition to open-loop driver inputs, the system 10 also uses vehicle inputs to generate the control outputs applied therein. As is shown in FIG. 1, the driver inputs (e.g., handwheel position, vehicle speed) are sent through a vehicle reference model 12. As will be described in further detail, the vehicle reference model 12 uses a reference model algorithm to generate desired vehicle handling aspects such as desired yaw rate and sideslip. The various vehicle inputs (e.g., sensed yaw rate, lateral acceleration) are sent through a vehicle state estimator 14 that, in addition to filtering sensed inputs, also provides other parameter estimation outputs that are not directly measured through sensing means. The outputs of both the vehicle reference model 12 and the vehicle state estimator 14 are inputted to vehicle control block 16 that ultimately provides the control outputs.

Figure 2:
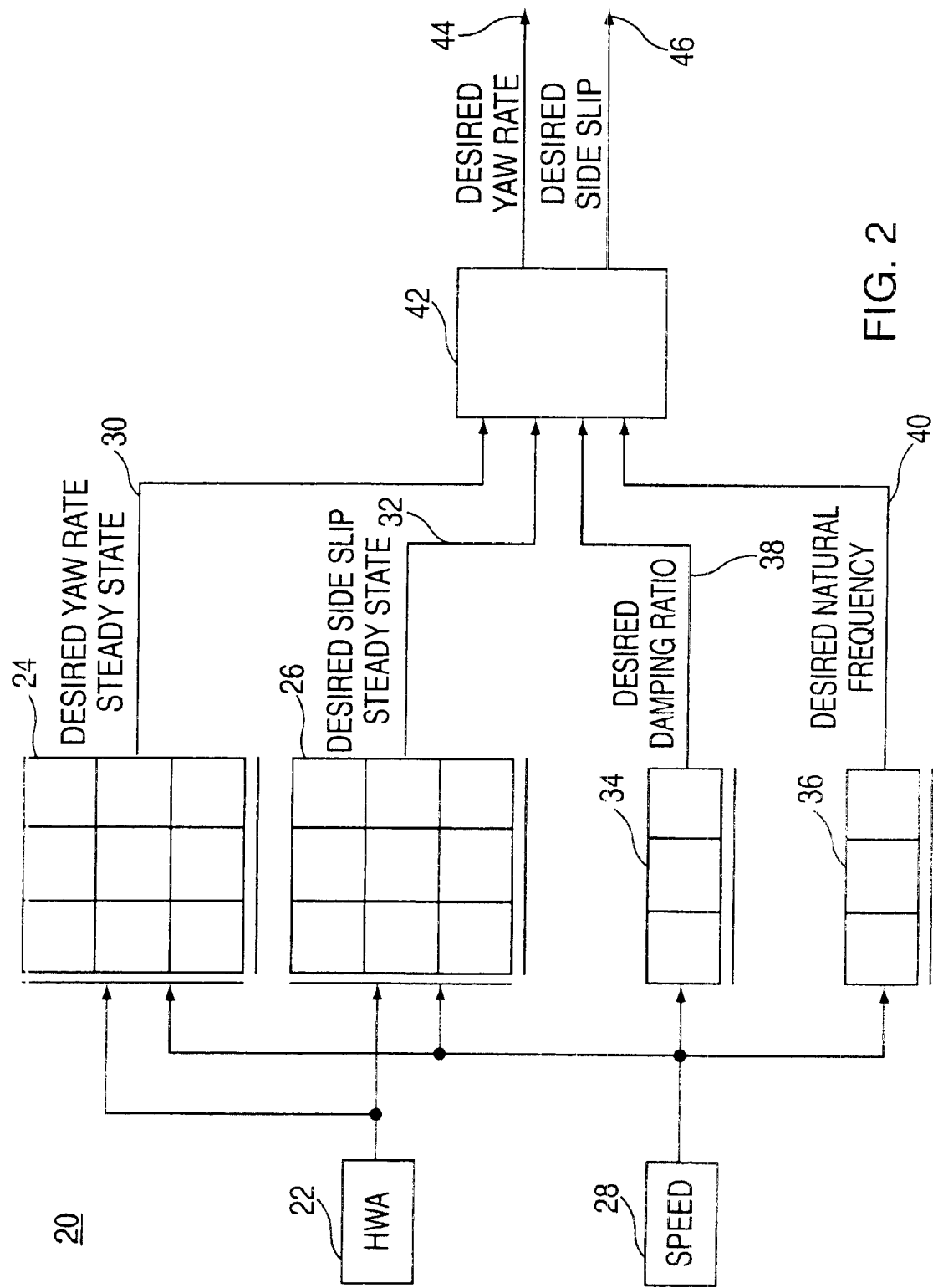
FIG. 2 is a block diagram that represents an existing VSE reference model algorithm used within a VSE system.

FIG. 2 is a block diagram that represents an existing VSE reference model algorithm 20 found in the vehicle reference model 12. The existing algorithm 20 uses lookup tables to determine four aspects of the desirable handling motion, specifically (1) a desired yaw rate; (2) a desired sideslip, (3) a desired damping ratio, and (4) a desired natural frequency. As shown in FIG. 2, algorithm 20 inputs the handwheel angle (HWA) 22 to lookup tables 24 and 26. In addition, the vehicle speed 28 is also inputted into lookup tables 24 and 26. The output 30 of lookup table 24 is a desired, steady state yaw rate. The output 32 of lookup table 26 is a desired, steady state sideslip. In addition, the vehicle speed 28 is further inputted into lookup tables 34 and 36. The output 38 from lookup table 34 yields the desired damping ratio, while the output 40 from lookup table 36 yields the desired natural frequency. Then, each of the lookup table outputs 30, 32, 38 and 40, are inputted into a filter 42 to produce a desired, dynamic yaw rate 44 and a desired, dynamic sideslip 46. These dynamic handling aspects are, among other inputs, used by the control block 16 in FIG. 1 to ultimately generate control outputs.

As indicated previously, a vehicle's handling response will change according to the particular driver's preference selected. These changes in handling response should correspondingly be reflected in the reference model 12 of the VSE system 10. Accordingly, the reference model algorithm 20 should therefore be updated to accommodate new, multi-mode steering systems by providing the flexibility for automatic adjustment of the calculation for the desirable handling motion for a given mode of operation. Furthermore, such automatic adjustments to the VSE reference model 12 should accommodate vehicle systems such as four-wheel steering, front controlled steering, and active roll control.

Figure 3:
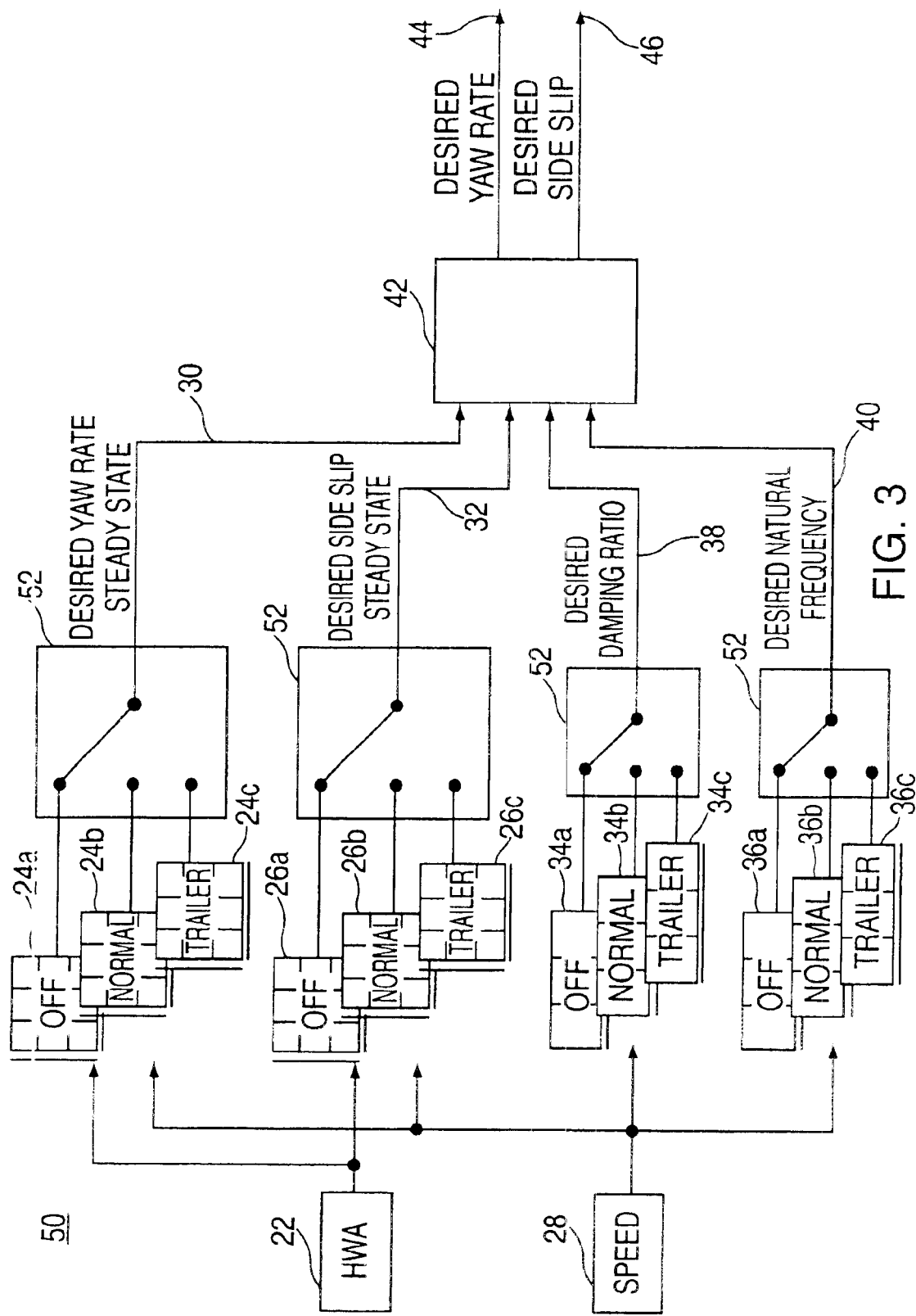
FIG. 3 is a block diagram that represents a modified VSE reference model algorithm, in accordance with an embodiment of the invention.

Therefore, in accordance with an embodiment of the present invention, there is disclosed a method for automatically adjusting the reference models used vehicle stability enhancement systems in response to a change in steering mode. The method includes, in one aspect, expanding the existing reference model structure in the VSE system 10 to include multiple lookup tables for each of the four desired handling aspects, with each lookup table tuned to match a specific mode of operation. Referring now to FIG. 3, there is shown block diagram that represents a modified VSE reference model algorithm 50. As can be seen, each of the lookup table outputs 30, 32, 38 and 40 are connected to a selector switch 52 that may be selectively coupled to one of three sets of lookup tables.

By way of example, the algorithm 50 of FIG. 3 illustrates three separate lookup tables representing three different modes of operation for a four-wheel steering system. In the example illustrated, one set of tables is tuned for an "Off Mode", another set is tuned for a "Normal Mode", and a third set is tuned for a "Trailer Mode". However, those skilled in the art will appreciate that algorithm 50 may be further expanded to accommodate additional sets of lookup tables for systems having additional modes with differing handling characteristics.

The algorithm 50 dynamically determines which set of lookup tables to use based on the state of, for example, a four-wheel steering system. In this manner, the reference model calculations are automatically adjusted so as to match the handling motion of the vehicle based on the selected mode of the steering system. As is shown in FIG. 3, the desired steady state yaw rate output 30 is generated by using the specific look up table (24a, 24b or 24c) that corresponds to the mode in which the steering system is currently operating. The selected mode of the steering system determines the relationship between HWA and rear wheel angle (RWA) as a function of vehicle speed. This relationship, in turn, determines the corresponding relationship between HWA and observed yaw rate. In order to tune the specific lookup table (e.g., 24a, 24b or 24c) that takes the vehicle speed 28 and HWA 22 and produces the desired, steady state yaw rate 30, vehicle tests are performed with the appropriate relationship between HWA and RWA in place. For each possible relationship between HWA and RWA, a separate table is kept in the vehicle reference model portion of the control system. These tables are then appropriately switched according to the operating mode of the steering system.

Similarly, the desired steady state sideslip 32 is also generated by using by using the specific lookup table (26a, 26b or 26c) that corresponds to the mode in which the steering system is currently operating. The same is true with respect to desired damping ratio 38 (associated with lookup tables 34a, 34b and 34c) and desired natural frequency 40 (associated with lookup tables 36a, 36b and 36c).

In the vehicle development process, the characteristic relationship between the HWA and RWA is often revised. In such a case, the corresponding lookup tables are subsequently regenerated, thereby resulting in significant vehicle development time and effort. Since separate lookup tables are now used for each of the modes of the steering system, any such changes may result in even further development time and effort.

Figure 4:
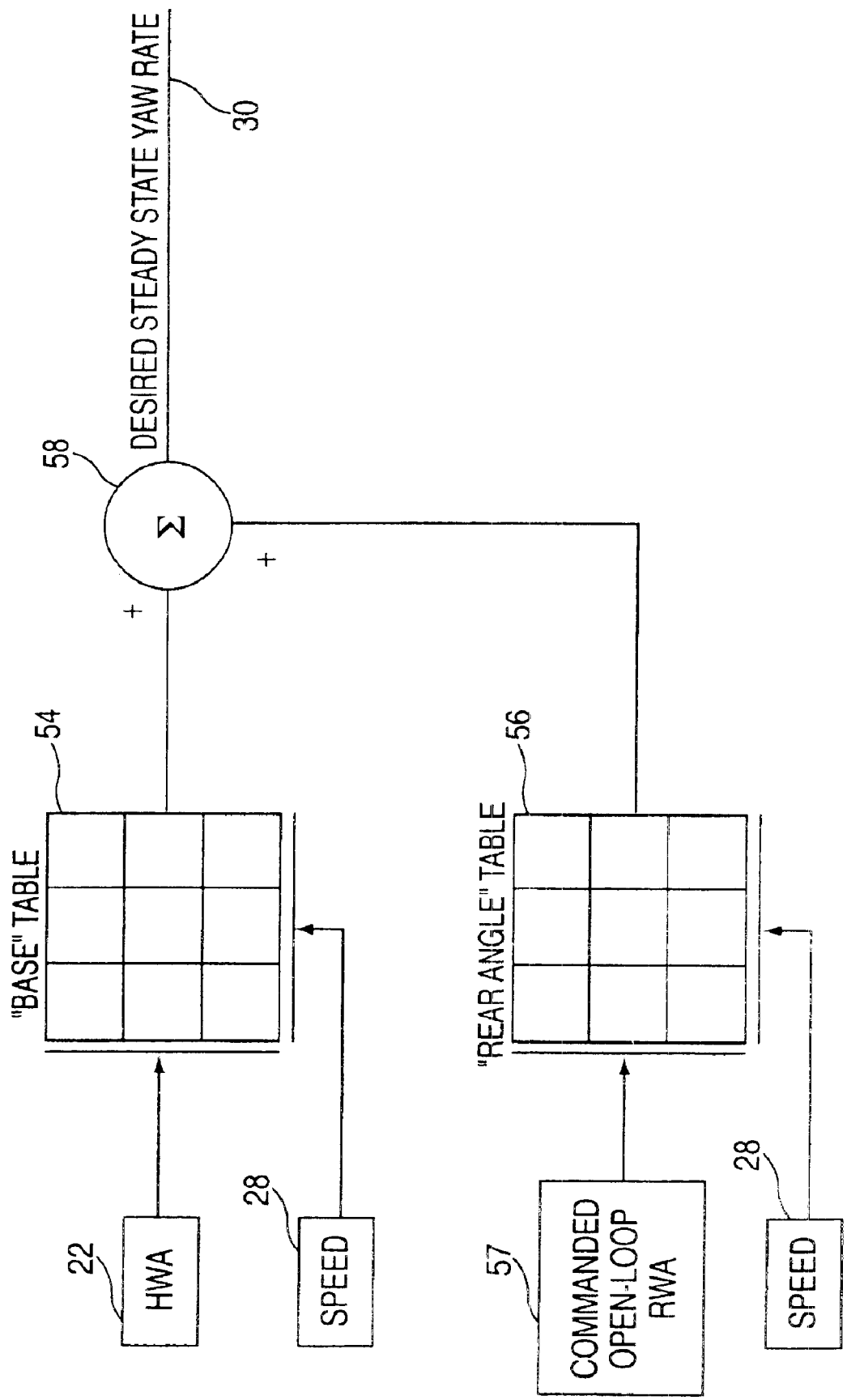
FIG. 4 is a block diagram of an alternative embodiment of the algorithm illustrated in FIG. 3.

Therefore, as an alternative approach to implementing separate lookup tables in the determination of both desired steady state yaw rate 30 and sideslip 32, a method that uses the commanded, open-loop RWA as an input is illustrated in FIG. 4. One advantage to this approach is that a base (i.e., "off") lookup table need only be developed once and will not need to be recalibrated, even if the relationship between HWA and RWA changes either during vehicle development or due to a driver preference mode change during normal operation. A further advantage to this approach stems from the fact that fewer lookup tables are stored in the reference model control memory.

As shown in FIG. 4, a "base" lookup table 54 is tuned to accept HWA 22 and speed 28 as inputs thereto when the RWA is set to zero. The output therefrom would represent the desired, steady state yaw rate 30 if the four-wheel steer system were in the "off" mode (i.e., no rear wheel steering applied). However, in order to allow for the other rear-wheel steer modes (i.e., "normal" and "trailer"), a second "rear angle" lookup table 56 is tuned to accept commanded, open-loop RWA 57 and speed 28 as inputs thereto. The rear angle lookup table 56 allows for possible combinations of RWA 57 and speed 28 such that the addition of the outputs of two tables 54, 56 at summation block 58 will be the actual desired steady state yaw rate 30. Although FIG. 4 shows only the generation of the desired steady state yaw rate 30, a similar base lookup table and rear angle lookup table could also be used to generate the desired steady state sideslip 32.

It should be noted that while the approach outlined in FIG. 4 may be used to determine yaw rate 30 and sideslip 32 as an alternative to the selector switch 52 arrangement illustrated in FIG. 3, the switch 52 would still be used in the determination of desired damping ratio 38 and natural frequency 40, since those two handling aspects are solely a function of speed and not HWA or RWA.

Figure 5:
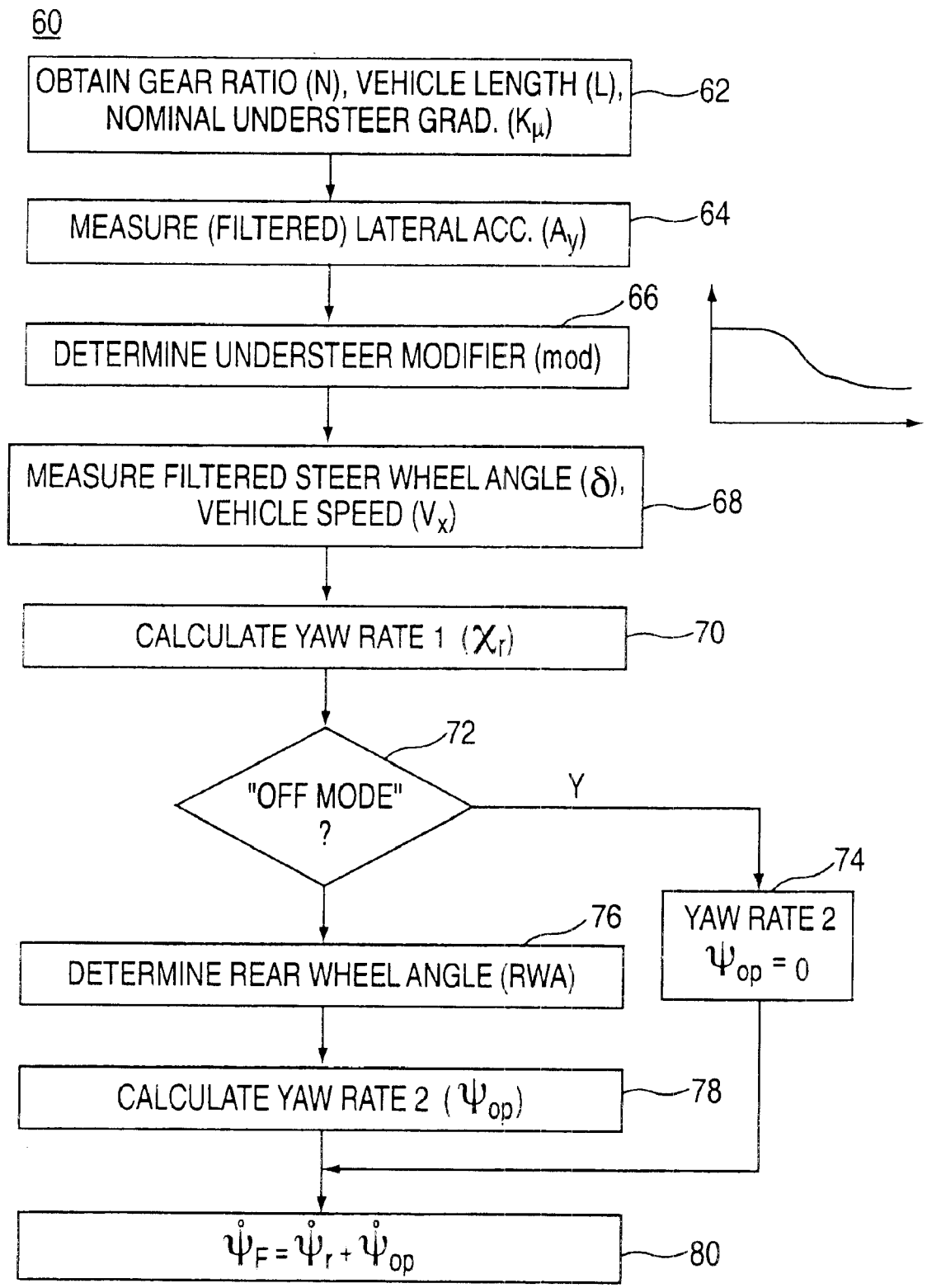
FIG. 5 is a flow diagram of an alternative embodiment of the algorithm illustrated in FIGS. 3 and 4.

Referring now to FIG. 5, there is shown a flow diagram that illustrates still another method 60 for obtaining the desired steady state yaw rate 30. In this approach, the desired steady state yaw rate 30 is calculated directly from vehicle parameters and measured vehicle states.

Beginning at block 62, the steering gear ratio (N), the vehicle length (L) and nominal understeer gradient ($K_\mu$) for the specific vehicle are initially obtained. Then, a filtered lateral acceleration ($A_y$) for the vehicle is measured at block 64. Based upon the absolute value of $A_y$, an understeer modifier (i.e., coefficient) is determined for the nominal understeer gradient at block 66. As shown in the insert graph adjacent thereto, the understeer modifier (mod) is tuned to be a function of the absolute value of the lateral acceleration. Generally, mod is reduced as the lateral acceleration is increased to reflect the reduction of the tire cornering stiffness as the slip angle increases. The understeer modifier will generally fall within the range of about 1.0 to about 0.2.

Additional measures of filtered steer wheel angle ($\delta$) and vehicle speed ($V_x$) are taken at block 68. Then, algorithm 60 proceeds to block 70 for the calculation of a first component of the steady state yaw rate, $\psi_r$, for steering conditions (such as the "off" mode) where there is no rear wheel angle component. The first part of the steady state yaw rate is given by:

$$\dot{\psi}_r = \frac{V_x}{[L + K_\mu V_x^2 / \text{mod}]N} \delta \qquad \text{eq. (1)}.$$

Once $\psi_r$ is determined, algorithm 60 proceeds to decision block 72 where it determined whether the steering mode is in the "off" mode, meaning there is no RWA component. If so, then the total desired steady state yaw rate is equal to the first component of the yaw rate, $\psi_r$. Thus, algorithm 60 sets a second component of the steady state yaw rate (due to open-loop controlled rear steering), $\psi_{op}$, equal to zero at block 74 and then forwards to block 80, as described hereinafter.

However, if the steering system is in the "normal" or "trailer" mode, then algorithm 60 alternatively proceeds to block 76 for a determination of the second component of the desired steady state yaw rate. At block 76, the rear wheel angle (RWA) is determined. This information, along with additional vehicle parameters, is used to calculate $\psi_{op}$ at block 78, given by:

$$\dot{\psi}_{op} / RWA = (a_{21} - a_{11} b_{22} / a_{11} a_{22} - a_{21} a_{12}) \qquad \text{eq. (2)};$$

with $$a_{11} = -\frac{C_f + C_r}{M_v V_x}$$

$$a_{12} = \frac{-aC_f + bC_r}{M_v V_x} - V_x$$

$$a_{21} = \frac{-aC_f + bC_r}{I_z V_x}$$

$$a_{22} = -\frac{a^2 C_f + b^2 C_r}{I_z V_x}$$

$$b_{21} = \frac{C_r}{M_v}$$

$$b_{22} = \frac{-bC_r}{I_z}$$

wherein:

$C_f$ is the cornering coefficient of the front tires;

$C_r$ is the cornering coefficient of the rear tires;

a is the distance from the vehicle center of gravity to the front axle;

b is the distance from the vehicle center of gravity to the rear axle;

$M_v$ is the total vehicle mass; and $I_z$ is the moment of inertia of the entire vehicle about the yaw axis.

Finally, at block 80, the first and second yaw rate components are added to produce the final, desired steady state yaw rate ($\psi_f$):

$$\dot{\psi}_f = \dot{\psi}_r + \dot{\psi}_{op} \qquad \text{eq. (3)}.$$

Figure 6:
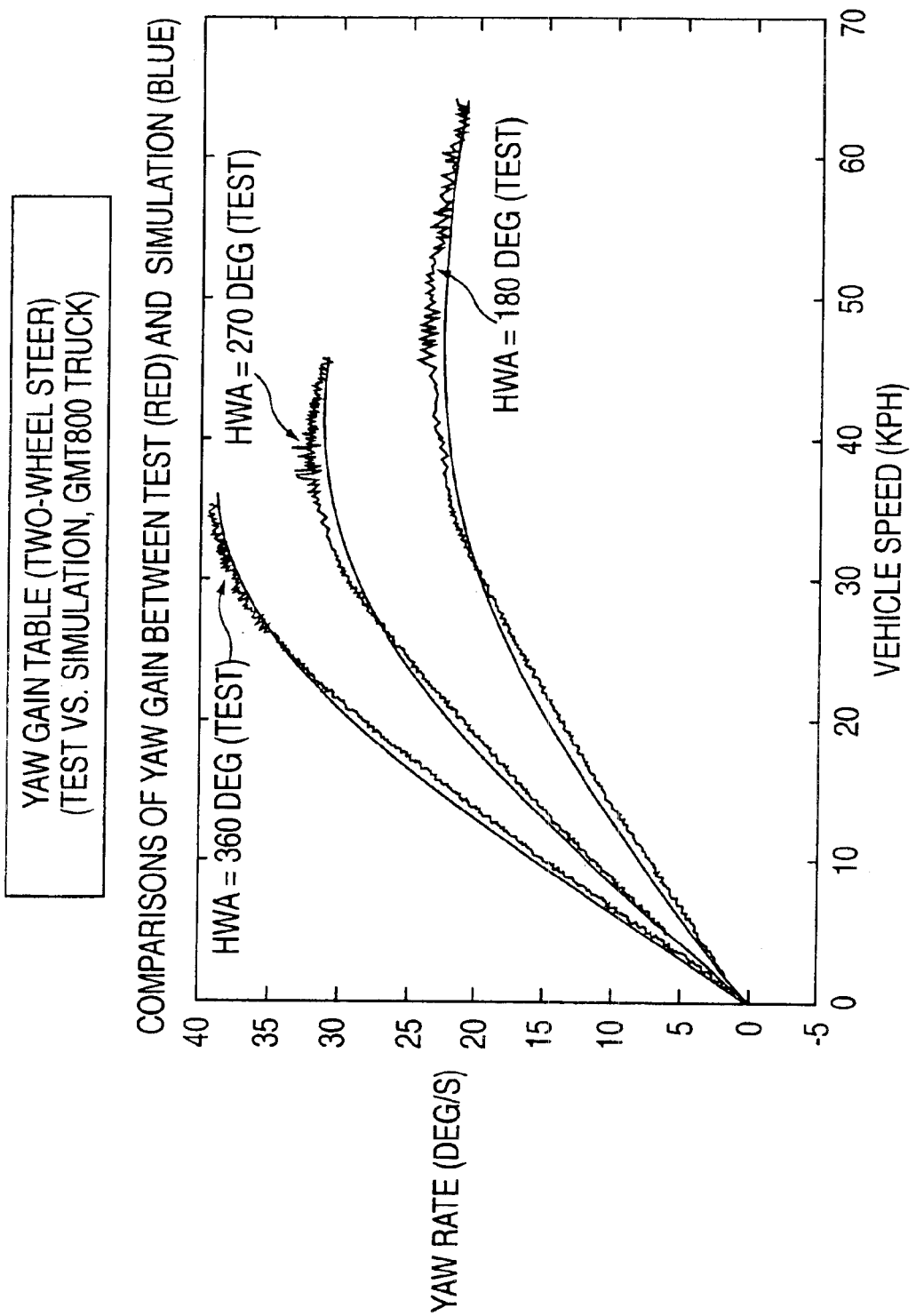
FIG. 6 is a graph that illustrates yaw rate comparisons between simulated results and actual test results for a test vehicle in a two-wheel steer mode.
Figure 7:
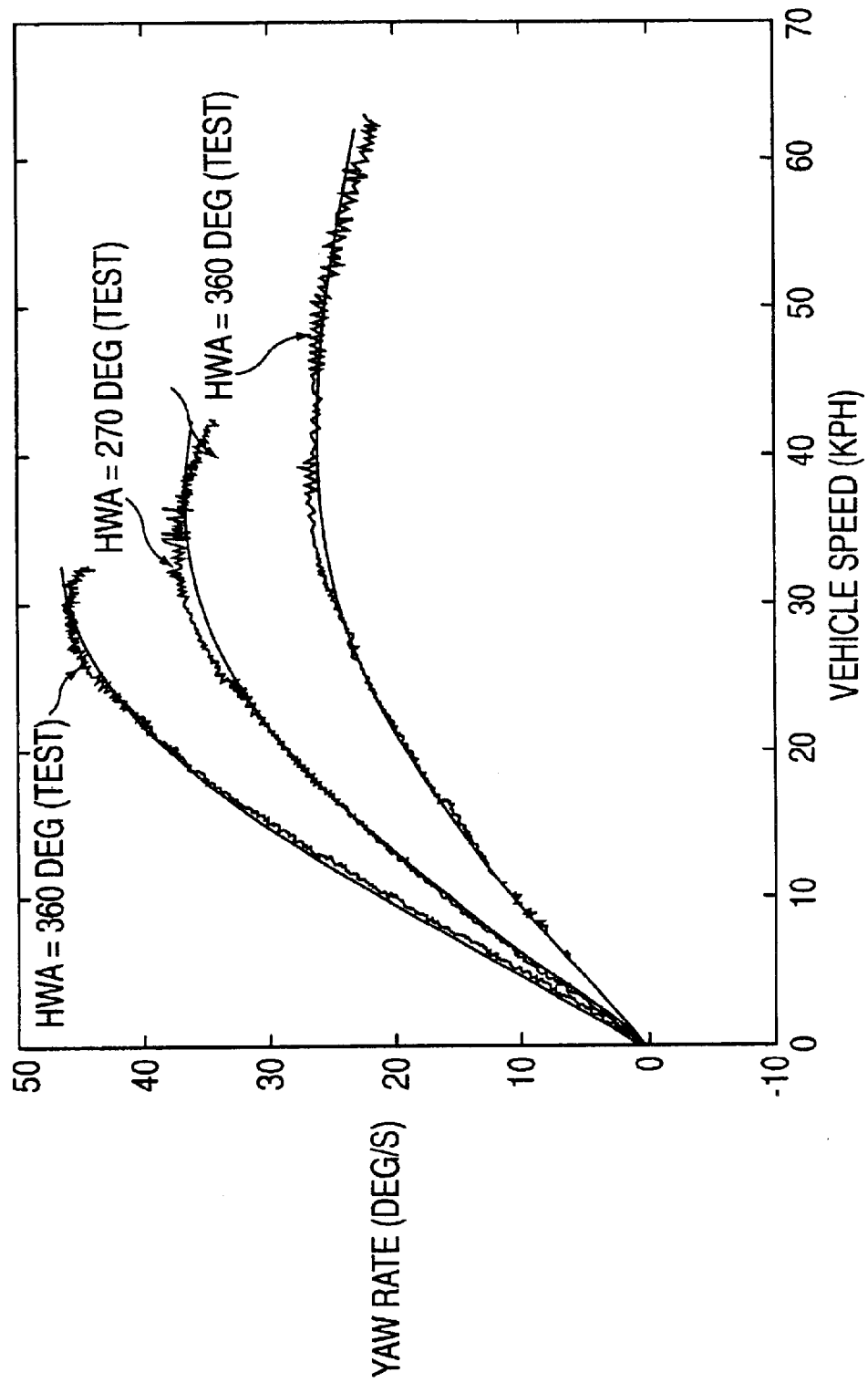
Figure 8:
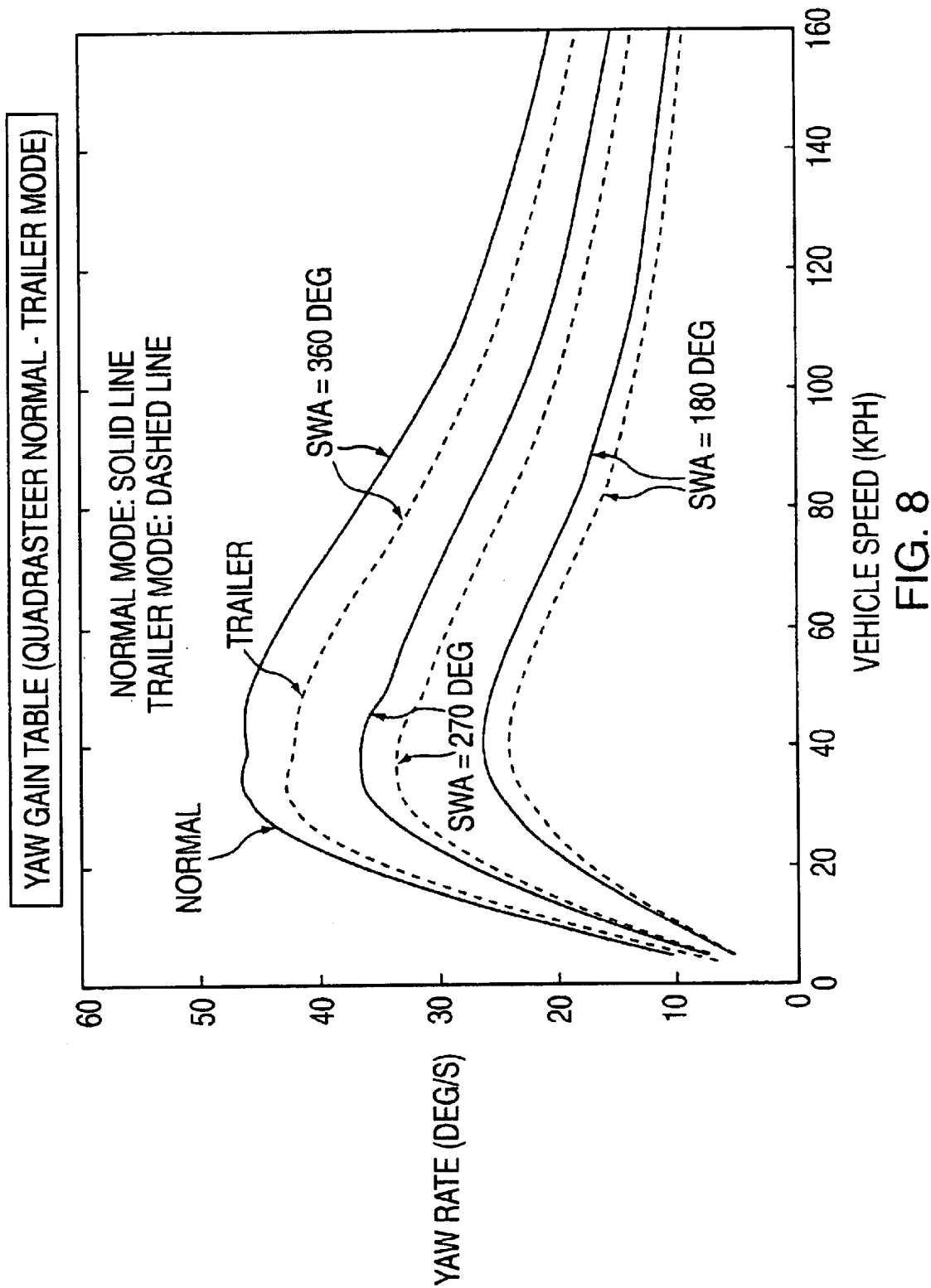
FIG. 8 is a graph that illustrates a comparison of simulated and actual results between a "normal" steering mode and a "trailer" steering mode.

Referring generally now to FIGS. 6 through 8, the graphs shown therein illustrate yaw rate comparisons between simulated results and actual test results for various steering modes and handwheel angle inputs. In FIG. 6, the yaw gain table was generated for a GMT800 truck in a two-wheel steer mode (i.e., four-wheel "off" mode). As explained earlier, the desired yaw rate is ultimately a function of handwheel angle and vehicle speed, as there is no rear wheel angle input in this steering mode. The results were generated at handwheel angles of 180°, 270° and 360°. The solid lines represent simulated yaw results and the dashed lines represent the actual vehicle test results. As can be seen, there is good correlation between the simulated yaw results and the vehicle test results.

In FIG. 7, the test vehicle was operated in the "normal" four-wheel steer mode with the commanded open-loop steer control on. Thus, the total desired yaw rate was the sum of the first and second components, with the second component taking the RWA into account. Again, the test results show good correlation between the simulated yaw results (solid lines) and the vehicle test results (dashed lines).

Finally, FIG. 8 illustrates a comparison of simulated and actual results between the "normal" steering mode (solid line) and the "trailer" steering mode (dashed lines). As can be seen, the addition of a vehicle trailer load reduces the degree of yaw over most of the range of vehicle speeds.

Through the use of the above described invention embodiments, a vehicle stability enhancement system may be adaptable to accommodate new, multimode steering systems. This is accomplished, in part, by providing the flexibility for automatic adjustment of the calculation for the desirable handling motion for a given mode of operation in systems such as four-wheel steering, front controlled steering, and active roll control.

In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as a data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method fur automatically adjusting a vehicle stability enhancement (VSE) system, the method comprising:

configuring a reference model within the VSE system to generate desired vehicle handling aspects, said desired vehicle handling aspects being a function of one or more driver inputs to a steering system; and determining which of a plurality of driver selectable steering model associated with the steering system is activated;

wherein each of said desired vehicle handling aspects generated is further dependent upon a specific steering mode selected.

2. The method of claim 1, wherein said desired vehicle handling aspects further comprise:

a desired steady state yaw rate;

a desired steady state sideslip;

a desired damping ratio; and a desired natural frequency.

3. The method of claim 2, wherein said one or more driver inputs further comprise:

a handwheel angle (HWA); and a vehicle speed.

4. The method of claim 3, further comprising:

configuring a set of lookup tables for generating each of said desired vehicle handling aspects;

wherein each lookup table within said set of lookup tables is individually tuned so as to correspond to said specific steering made selected.

5. The method of claim 4, wherein:

said set of lookup tables corresponding to said desired steady state yaw rate have said HWA as a first input thereto, and said vehicle speed as a second input thereto;

said set of lookup tables corresponding to said desired steady state sideslip have said HWA as a first input thereto, and said vehicle speed as a second input thereto;

said set of lookup tables corresponding to said desired damping ratio have said vehicle speed as a first input thereto; and said set of lookup tables corresponding to said desired natural frequency have said vehicle speed as a first input thereto.

6. The method of claim 5, further comprising:

configuring a switching mechanism, said switching mechanism having a plurality of outputs therefrom corresponding to said desired vehicle handling aspect; and said switching mechanism further having said set of lookup tables as inputs thereto;

wherein, responsive to said specific steering mode selected, said switching mechanism selectively couples said inputs thereto to said outputs therefrom.

7. The method of claim 3, wherein said desired steady state yaw rate for a given selected steering mode is generated by:

configuring a base lookup table to accept said HWA as a first input thereto and said vehicle speed as a second input thereto;

configuring a rear angle lookup table to accept a commanded, open-loop rear wheel angle (RWA) as a first input thereto and said vehicle speed as a second input thereto; and summing a resulting output from said base lookup table with a resulting output from said rear angle lookup table.

8. The method of claim 3, wherein said desired steady state yaw rate for a given selected steering mode is generated by:

calculating a first yaw rate component;

determining whether said specific steering mode selected results in a rear wheel angle (RWA) input being generated;

if an RWA input is generated, then calculating a second yaw rate component;

if no RWA input is generated, then setting said second yaw rate component equal to zero; and summing said first yaw rate component with said second yaw rate component.

9. The method of claim 8, wherein said first yaw rate component is calculated from:

a vehicle length;

a vehicle gear ratio;

an understeer gradient;

an understeer modifier coefficient;

said HWA; and said vehicle speed.

10. The method of claim 9, wherein if an RWA input is generated, then said second yaw rate component is calculated from:

said RWA input;
a cornering coefficient of vehicle front tires;
a cornering coefficient of vehicle rear tires;
a distance from a vehicle center of gravity to a front axle;
a distance from said vehicle center of gravity to a rear axle;
a total vehicle mass; and
a vehicle moment of about a yaw axis.

11. The method of claim 3, further comprising:
configuring a filter to accept said desired handling aspects as inputs thereto, said filter thereby generating a desired, dynamic yaw rate and a desired, dynamic sideslip as outputs therefrom.

12. A computer readable storage medium, comprising:
computer program code for automatically adjusting a vehicle stability enhancement (VSE) system, the VSE system used in conjunction with a steering system; and
instructions for causing a computer to implement a method, the method further comprising:
configuring a reference model within the VSE system to generate desired vehicle handling aspects, said desired vehicle handling aspects being a function of one or more driver inputs to a steering system; and
determining which of a plurality of driver selectable steering modes associated with the steering system is activated;
wherein each of said desired vehicle handling aspects generated is further dependent upon a specific steering made selected.

13. The computer readable storage medium of claim 12, wherein said desired vehicle handling aspects further comprise:
a desired steady state yaw rate;
a desired steady state sideslip;
a desired damping ratio; and
a desired natural frequency.

14. The computer readable storage medium of claim 13, wherein said one or more driver inputs further comprise:
a handwheel angle (HWA); and
a vehicle speed.

15. The computer readable storage medium of claim 14, further compiising:
configuring a set of lockup tables for generating each of said desired vehicle handling aapects;
wherein each lockup table within said set of lookup tables is individually tuned so as to correspond to said specific steering mode selected.

16. The computer readable storage medium of claim 15, wherein:
said set of lookup tables corresponding to said desired steady state yaw rate have said HWA as a first input thereto, and said vehicle speed as a second input thereto;
said set of lookup tables corresponding to said desired steady state sideslip have said HWA as a first input thereto, and said vehicle speed as a second input thereto;
said set of lookup tables corresponding to said desired damping ratio have said vehicle speed as a first input thereto; and
said set of lookup tables corresponding to said desired natural frequency have said vehicle speed as a first input thereto.

17. The computer readable storage medium of claim 16, further comprising:
configuring a switching mechanism, said switching mechanism having a plurality of outputs therefrom corresponding to said desired vehicle handling aspects; and
said switching mechanism further having said set of lookup tables as inputs thereto;
wherein, responsive to said specific steering mode selected, said switching mechanism selectively couples said inputs thereto to said outputs therefrom.

18. The computer readable storage medium of claim 17, wherein said desired steady state yaw rate for a given selected steering mode is generated by:
configuring a base lookup table to accept said HWA as a first input thereto and said vehicle speed as a second input thereto;
configuring a rear angle lookup table to accept a commanded, open-loop rear wheel angle (RWA) as a first input thereto and said vehicle speed as a second input thereto; and
summing a resulting output from said base lookup table with a resulting output from said rear angle lookup table.

19. The computer readable storage medium of claim 14, wherein said desired steady state yaw rate for a given selected steering mode is generated by:
calculating a first yaw rate component;
determining whether said specific steering mode aelected results in a rear wheel angle (RWA) input being generated;
if an RWA input is generated, then calculating a second yaw rate component;
if no RWA input is generated, then setting said second yaw rate component equal to zero; and
summing said first yaw rate component with said second yaw rate component.

20. The computer readable storage medium of claim 19, wherein said first yaw rate component is calculated from:
a vehicle length;
a vehicle gear ratio;
an understeer gradient;
an understeer modifier coefficient;
said HWA; and
said vehicle speed.

21. The computer readable storage medium of claim 20, wherein if an RWA input is generated, then said second yaw rate component is calculated from:
said RWA input;
a cornering coefficient of vehicle front tires;
a cornering coefficient of vehicle rear tires;
a distance from a vehicle center of gravity to a front axle;
a distance from said vehicle center of gravity to a rear axle;
a total vehicle mass; and
a vehicle moment of about a yaw axis.

22. A computer data signal embodied on a computer readable medium, comprising:
code configured to cause a processor to implement a method for automatically adjusting a vehicle stability enhancement (VSE) system, the method further comprising:

configuring a reference model within a VSE system to generate desired vehicle handling aspects, said desired vehicle handling aspects being a function of one or more driver inputs to the steering system; and determining which of a plurality of driver selectable steering modes associated with the steering system is activated;

wherein each of said desired vehicle handling aspects generated is further dependent upon a specific steering mode selected.

23. The computer data signal embodied on a computer readable medium of claim 22, wherein said desired vehicle handling aspects further comprise:

a desired steady state yaw rate;

a desired steady state sideslip;

a desired damping ratio; and a desired natural frequency.

24. The computer data signal embodied on a computer readable medium of claim 23, wherein said one or more driver inputs further comprise:

a handwheel angle (HWA); and a vehicle speed.

25. The computer data signal embodied on a computer readable medium of claim 24, further comprising:

configuring a set of lookup tables for generating each of said desired vehicle handling aspects;

wherein each lockup table within said set of lookup tables is individually tuned so as to correspond to said specific steering mode selected.

26. The computer data signal embodied on a computer readable medium of claim 25, wherein:

said set of lockup tables corresponding to said desired steady state yaw rate have said HWA as a first input thereto, and said vehicle speed as a second input thereto;

said set of lookup tables corresponding to said desired steady state sideslip have said HWA as a first input thereto, and said vehicle speed as a second input thereto;

said set of lookup tables corresponding to said desired damping ratio have said vehicle speed as a first input thereto; and said set of lookup tables corresponding to said desired natural frequency have said vehicle speed as a first input thereto.

27. The computer data signal embodied on a computer readable medium of claim 26, further comprising:

configuring a switching mechanism, said switching mechanism having a plurality of outputs therefrom corresponding to said desired vehicle handling aspects; and said switching mechanism further having said set of lookup tables as inputs thereto;

wherein, responsive to said specific steering mode selected, said switching mechanism selectively couples said inputs thereto to said outputs therefrom.

28. The computer data signal embodied on a computer readable medium of claim 24, wherein said desired steady state yaw rate for a given selected steering mode is generated by;

configuring a base lookup table to accept said HWA as a first input thereto and said vehicle speed as a second input thereto;

configuring a rear angle lookup table to accept a commanded, open-loop rear wheel angle (RWA) as a first input thereto and said vehicle speed as a second input thereto; and summing a resulting output from said base lookup table with a resulting output from said rear angle lookup table.

29. The computer data signal embodied on a computer readable medium of claim 24, wherein said desired steady state yaw rate for a given selected steering mode is generated by:

calculating a first yaw rate component;

determining whether said specific steering mode selected results in a rear wheel angle (RWA) input being generated;

if an RWA input is generated, then calculating a second yaw rate component;

if no RWA input is generated, then setting said second yaw rate component equal to zero; and summing said fist yaw rate component with said second yaw rate component.

30. The computer data signal embodied on a computer readable medium of claim 29, wherein said first yaw rate component is calculated from:

a vehicle length;

a vehicle gear ratio;

an understeer gradient;

an understeer modifier coefficient;

said HWA; and said vehicle speed.

31. The computer data signal embodied on a computer readable medium of claim 30, wherein if an RWA input is generated, then said second yaw rate component is calculated from:

said RWA input;

a cornering coefficient of vehicle front tires;

a cornering coefficient of vehicle rear tires;

a distance from a vehicle center of gravity to a front axle;

a distance from said vehicle center of gravity to a rear axle;

a total vehicle mass; and a vehicle moment of about a yaw axis.

32. A vehicle stability enhancement (VSE) system, comprising:

a reference model configured to generate desired vehicle handling aspects, said desired vehicle handling aspects being a function of one or more driver inputs to a steering system, said steering system having a plurality of driver selectable steering modes associated therewith;

a vehicle state estimator, said vehicle state estimator accepting vehicle inputs thereto and generating vehicle parameter estimations therefrom; and a vehicle control block, said vehicle control block receiving said desired vehicle handling aspects and said vehicle parameter estimations as inputs thereto, and said vehicle control block further generating vehicle control outputs to be applied to said steering system;

wherein each of said desired vehicle handling aspects generated is further dependent upon a specific driver selectable steering mode selected.

33. The VSE system of claim 32, wherein said desired vehicle handling aspects further comprise:
- a desired steady state yaw rate;
- a desired steady state sideslip;
- a desired damping ratio; and
- a desired natural frequency.

34. The VSE system of claim 33, wherein said one or more driver inputs further comprise:
- a handwheel angle (HWA); and
- a vehicle speed.

35. The VSE system of claim 34, further comprising:
- a set of lookup tables configured for generating each of said desired vehicle handling aspects;
- wherein each lookup table within said set of lookup tables is individually tuned so as to correspond to said specific steering mode selected.

36. The VSE system of claim 35, wherein:
- said set of lookup tables corresponding to said desired steady state yaw rate have said HWA as a first input thereto, and said vehicle speed as a second input thereto;
- said set of lookup tables corresponding to said desired steady state sideslip have said HWA as a first input thereto; and said vehicle speed as a second input thereto;
- said set of lookup tables corresponding to said desired damping ratio have said vehicle speed as a first input thereto; and
- said set of lookup tables corresponding to said desired natural frequency have said vehicle speed as a first input thereto.

37. The VSE system of claim 35, further comprising:
- a switching mechanism configured to have a plurality of outputs therefrom corresponding to said desired vehicle handling aspects; and
- said switching mechanism further having said set of lookup tables as inputs thereto;
- wherein, responsive to said specific steering mode selected, said switching mechanism selectively couples said inputs thereto to said outputs therefrom.

38. The VSE system of claim 34, wherein said desired steady state yaw rate for a given selected steering mode is generated by:
- a base lookup table configured to accept said HWA as a first input thereto and said vehicle speed as a second input thereto;
- a rear angle lookup table configured to accept a commanded, open-loop rear wheel angle (RWA) as a first input thereto and said vehicle speed as a second input thereto; and
- a resulting output from said base lookup table being summed with a resulting output from said rear angle lookup table.

39. The VSE system of claim 35, further comprising: a filter configured to accept said desired handling aspects as inputs thereto, said filter thereby generating a desired, dynamic yaw rate and a desired, dynamic sideslip as outputs therefrom.

* * * * *